March 10, 1953 — S. L. MORROW — 2,630,698
VEHICLE TRAIN LOCK

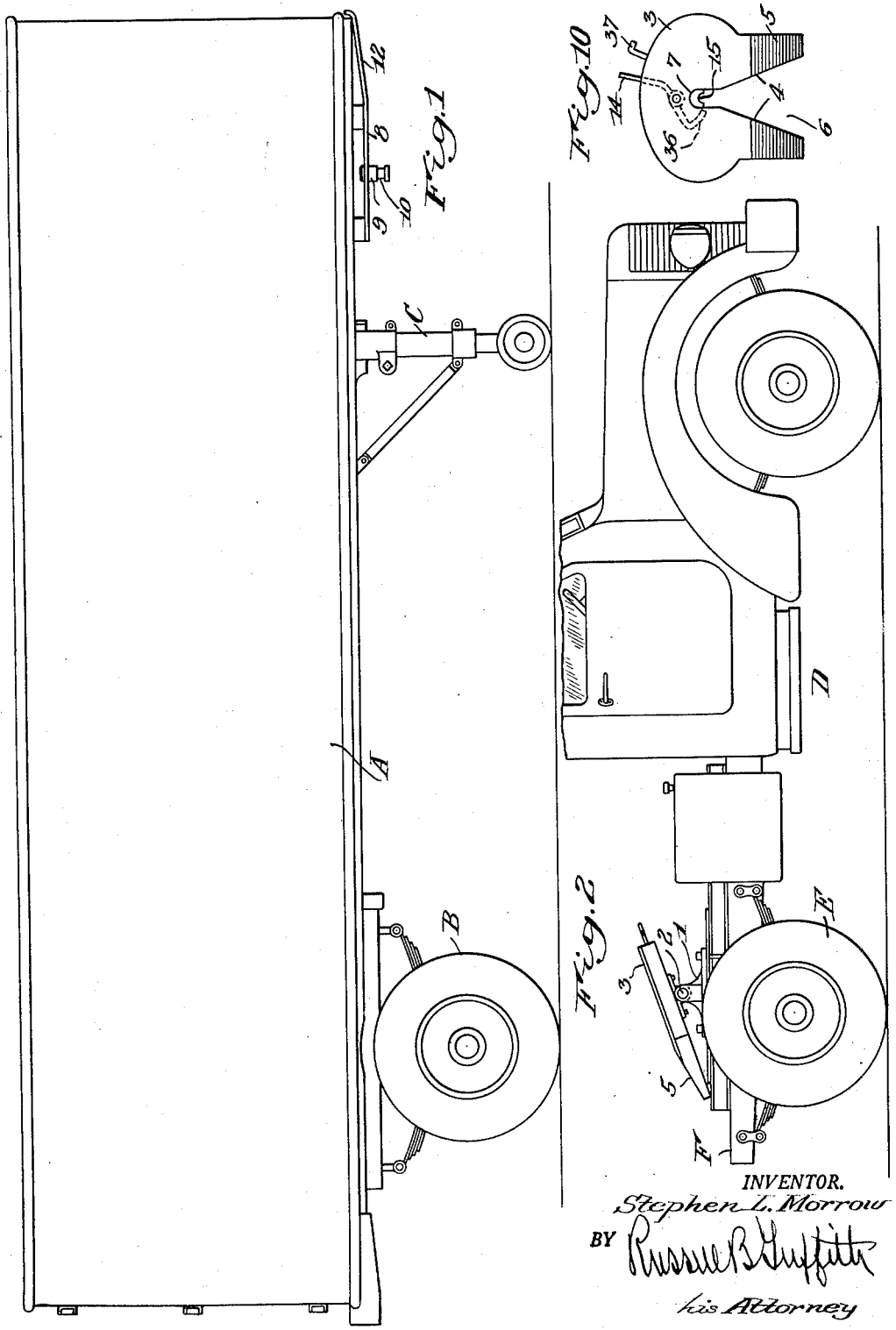

Filed June 9, 1949 — 3 Sheets-Sheet 2

INVENTOR.
Stephen L. Morrow
BY Russell B. Griffith
his Attorney

March 10, 1953 S. L. MORROW 2,630,698
VEHICLE TRAIN LOCK
Filed June 9, 1949 3 Sheets-Sheet 3
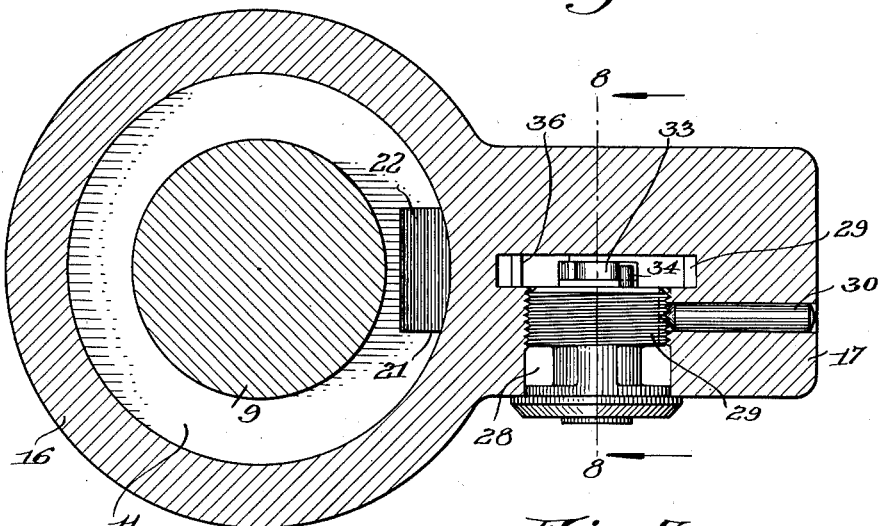
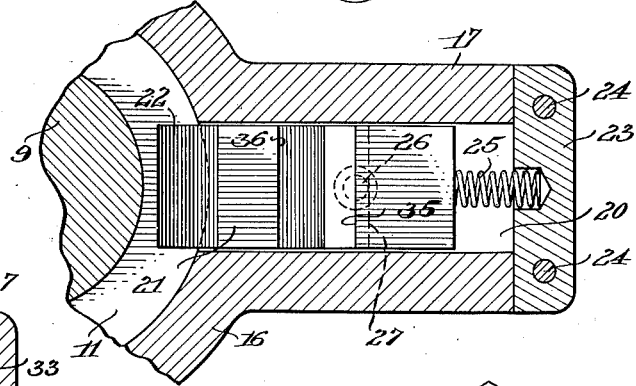
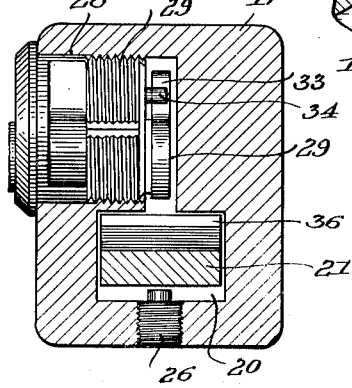
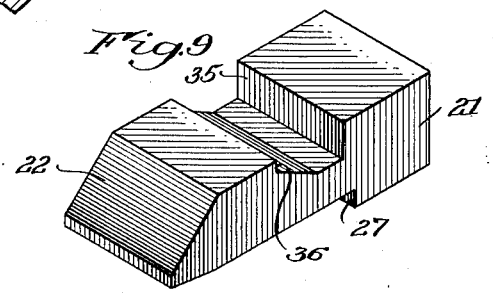
INVENTOR.
Stephen L. Morrow
BY Russell B. Griffith
his Attorney Patented Mar. 10, 1953

2,630,698

UNITED STATES PATENT OFFICE 2,630,698

VEHICLE TRAIN LOCK

Stephen L. Morrow, Webster, N. Y.

Application June 9, 1949, Serial No. 98,099

1 Claim. (Cl. 70—232)

My present invention relates to road vehicles and more particularly to the larger and heavier freight transportation vehicles of the trailer or train type comprising two units: a forward motorized driving unit and a rearward van. These units are detachably connected by a coupling consisting of a coupling unit on the forward end of the van and a complementary unit on the rear end of the driving unit so arranged that the latter may be backed up to and hitched, selectively, successively to any number of vans, picking it up when loaded and parking it when empty for a reload.

This results in there often being loaded vans, with valuable contents, standing unattended while waiting return of the tractor unit and there has been heretofore (to my knowledge) nothing to prevent "highjackers" as this type of thief is called, from driving up with a duplicate standard tractor, the coupling units being standard and driving off with the goods, van and all, which has frequently been done.

It is the object of my present invention to prevent thefts of this kind by providing means for so locking the hitching gear of the van that it can not be coupled, in the regular way at least, to a tractor or driving vehicle by unauthorized persons and it contemplates provision of a portable locking unit applicable to all vans of a standard make, and so devised that it may be operatively applied to or removed from an essential element of the van coupling by those in possession of a key.

To these and other ends the invention resides in certain improvements and combinations of parts, as will be hereinafter more fully described, the novel features being pointed out in the claim at the end of this specification.

In the drawings:

Figure 1 is a fragmentary side elevation of the rear freight unit or van, detached, of a trailer train constructed in accordance with and embodying the arrangements of my invention;

Figure 2 is a similar view of the forward motorized traction and hauling unit of the train;

Figure 6 is a horizontal section through the lock taken on the line 6—6 of Fig. 4;

Figure 7 is a similar fragmentary section taken on the line 7—7 of Fig. 4;

Figure 8 is a vertical section taken on the line 8—8 of Fig. 6;

Figure 9 is a detailed perspective view of the latch bolt and

Figure 10 is a top plan view of the coupling element on the motorized hauling or tractor unit of the train.

Similar reference numerals throughout the views indicate the same parts.

Figure 3:
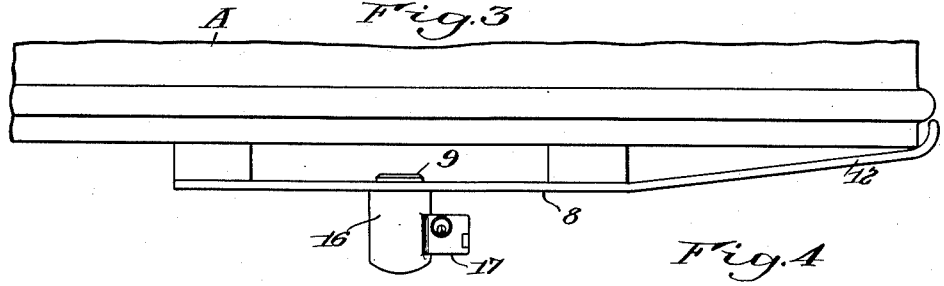
Figure 3 is an enlarged fragmentary side elevation of the coupling pin assembly on the trailer unit with my locking device applied thereto.

Referring more particularly to the drawings, and first to Figs. 1 and 2 thereof, A indicates a trailer van body provided with ground wheels B at the rear and the usual folding parking gear C near the front to support that portion when the van is at rest and unattached to its hauling truck which latter is indicated at D, Fig. 2, to comprise driving ground wheels E on a frame F.

At the rear of the latter is a base bracket 1 on which is journaled at 2 to turn on a horizontal transverse axis the lower segment or table 3 of a fifth-wheel combination. This segment is (when not in use) normally tilted downwardly and rearwardly as shown in the elevation and its rearward arms 4 are beveled to a still steeper angle downwardly and rearwardly as indicated at 5 in Fig. 10. That figure further shows a wide slot 6 between said arms open at the rear and converging forwardly to terminate in an open vertical bearing 7 at the center of the table segment 3.

Turning now to the van body of Figs. 1 and 3 the forward end thereof on the underside is fitted with a generally complementary fifth-wheel segment 8 adapted to rest and to rotate to a limited extent upon truck segment 3 in which relationship the latter, of course, rocks on its journals to a horizontal position and the two trailer-truck bodies may thus swing relatively in travelling to compensate for changes in direction. This swinging motion is centered on a coupling pin or king bolt 9 fixed centrally of the segment 8 and rigid therewith, the same comprising in the present instance a headed stud pin, the head being formed by a circumferential groove 10 that furnishes a locking shoulder 11 that performs a dual function as will hereinafter appear.

When the truck and van are detached as in the figures and it is desired to couple them for transport it is only necessary to back the former under the front end of the latter until the forward end of the fifth-wheel segment 8, which is forwardly and upwardly inclined at 12 for the purpose, rides on an inclined truck segment 3 and straightens it out as its weight falls upon it. This lifts the forward end of the van slightly to permit the parking gear C to be folded up underneath the body. At the same time, king bolt stud 9 is guided by slot 6 into the bearing 7.

To prevent the king pin from disengaging vertically due to inequalities in the ground, an element on the underside of the truck segment 3, Fig. 10, enters the groove 10 and locks against shoulder 11, said element being notched at 15 to let it in to the reduced portion of the pin. In opposition to it is a hook 36, also pivoted on the underside, which is operated by a hand lever 14, is thrown into engagement with the rear of the pin to take the drag and complete the coupling. This hook is in turn secured in operative position by a latch (not fully shown) on another hand lever 37.

The structure so far described is old and it is obvious that anyone possessed of the tractor truck portion D of a vehicle train could back it under any corresponding trailer van A and make off with it. In the practice of my invention, I provide a portable lock that the authorized driver may carry with him and which, when applied to a van that he has parked will so alter the conformation of the king bolt stud 9 that it can no longer be coupled to the fifth-wheel segment of the truck. This lock embodies, in the present embodiment, a steel block 16 having a lateral extension lug 17 offset from a central circular cavity or socket 18 making the design generally tubular. The cavity closely but rotatably fits over and completely conceals the stud, the block or tube at its upper end being preferably beveled inwardly as indicated at 19 so that it will present a backed off edge to abut the fifth-wheel segment 8 that is coated with heavy grease that might otherwise prevent close contact. This not only properly positions the block on the stud but leaves no crevice for the introduction of a prying tool.

Leading from the cavity 18 transversely thereof is a guideway 20 cut in the lug 17 which is occupied by a square latch bolt 21 shown in detail in Fig. 9. Its nose 22 normally projects into cavity 18 engaging shoulder 11 of the stud 9 to support the block and lock it thereto as in Fig. 4. The guideway 20 is initially cut through to the end face of the lug 17 and then sealed exteriorly by a plug 23 that is secured with swedged blind pins 24 (dotted lines, Fig. 4). A spring 25 reacts against this plug to maintain the bolt in the described locking position which latter is limited by a dog-nosed set screw 26 in the lug that engages a shoulder 27 on the under side of the bolt.

Figure 4:
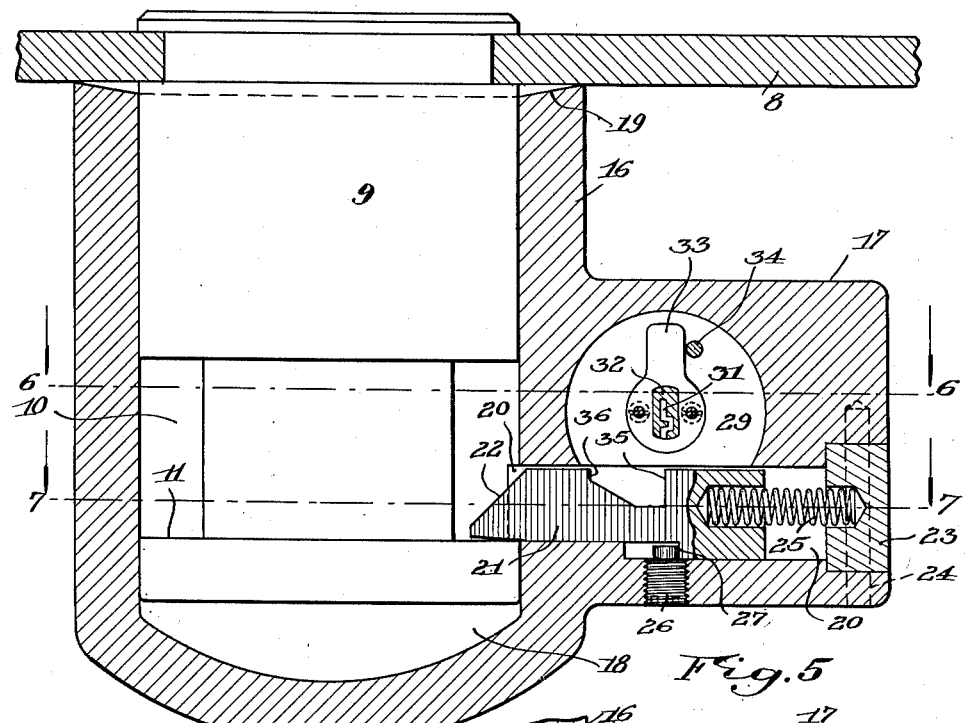
Figure 4 is an enlarged side view of the pin and lock with the latter in longitudinal central section and the bolt thereof in engaged position.
Figure 5:
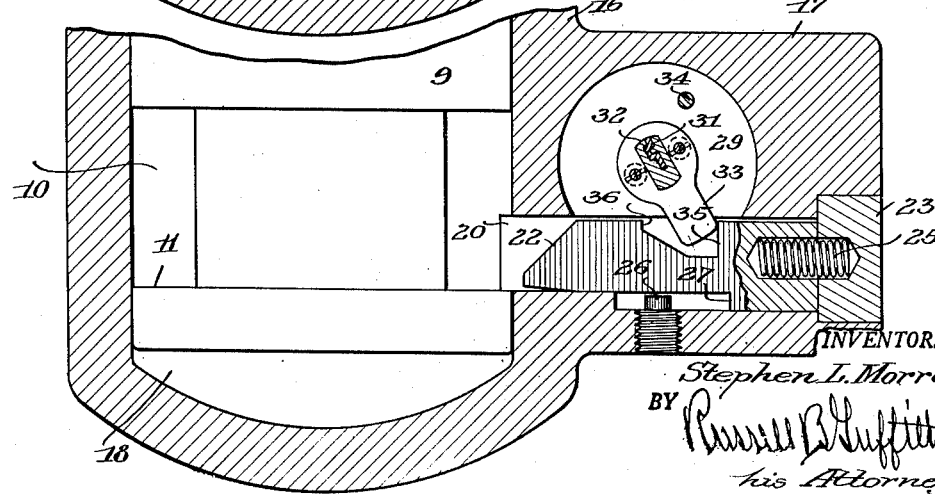
Figure 5 is a view similar to Figure 4 but with the bolt in released position.

Another but relatively lateral recess 28 in lug 17 (Figs. 6 and 8) is occupied by the housing 29 with anchoring pin 30 of a common form of cylinder, key controlled lock that requires no detailed description here. The key slot 31 in the cylinder 32 is shown in Figs. 4 and 5. The inner end of the rotary cylinder carries an actuating dog 33 normally abutting a stop 34 on the housing. When the cylinder is key turned, the dog engages an actuating shoulder 35 on bolt 21 retracting it against the tension of its spring and releasing the whole block from the coupling stud 9. The dog 33, when reversed, also positively actuates the bolt to engaging position should the spring 25 fail to operate effectively by engaging an opposite slip-off shoulder 36.

The locking block herein described is highly resistant to attack by force. Attention has previously been called to the difficulty of entering any prying tool between its upper end and the segment 8 while a twisting, wrenching action would result only in the whole block idly turning without resistance on the coupling pin.

I claim as my invention:

A locking device for the downwardly directed shouldered king pin rigidly fixed to the under surface of a fifth wheel mounted on the bottom of the front end of a van body, the shoulder of the king pin being integral therewith, said device being in the form of a metal block having a wall defining a socket therein closely fitting over the king pin with the margin of the wall of the block defining the opening therein substantially in contact with the under surface of the fifth wheel whereby the king pin is virtually completely enclosed, said margin being beveled to a relatively narrow edge as compared with the thickness of the block wall defining said socket, and manually actuated locking mechanism in said device engageable with the shoulder on said king pin to retain said device thereon in the mentioned relation to said fifth wheel.

STEPHEN L. MORROW.

REFERENCES CITED

The following references are of record in the file of this patent:

UNITED STATES PATENTS

| Number | Name | Date |
| --- | --- | --- |
| 1,530,521 | Robinson | Mar. 24, 1925 |
| 1,881,567 | Henke | Oct. 11, 1932 |
| 2,440,744 | Grinell et al. | May 4, 1948 |
| 2,554,306 | Mack | May 22, 1951 |